J. POOL.
FARM GATE.

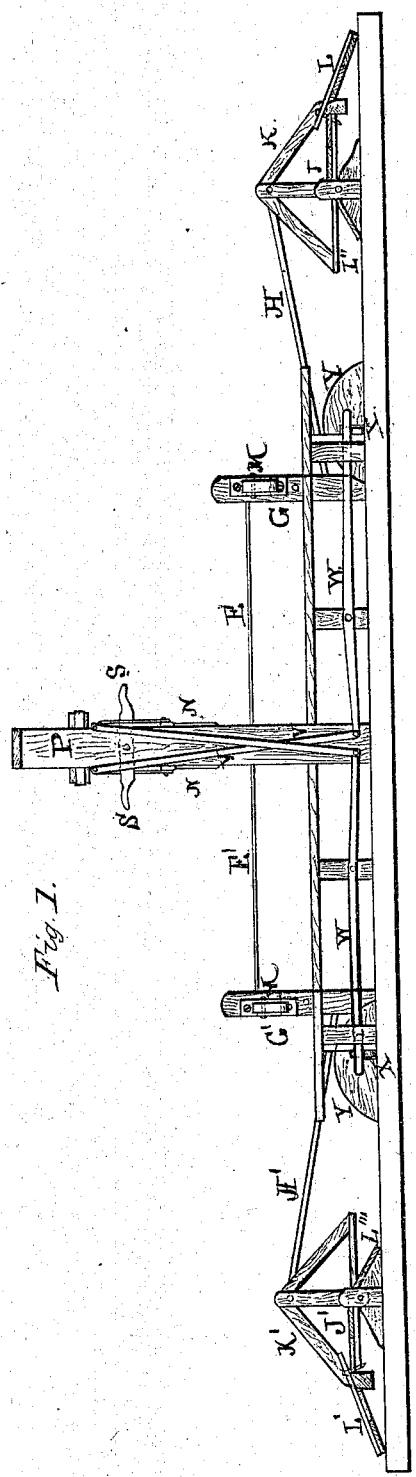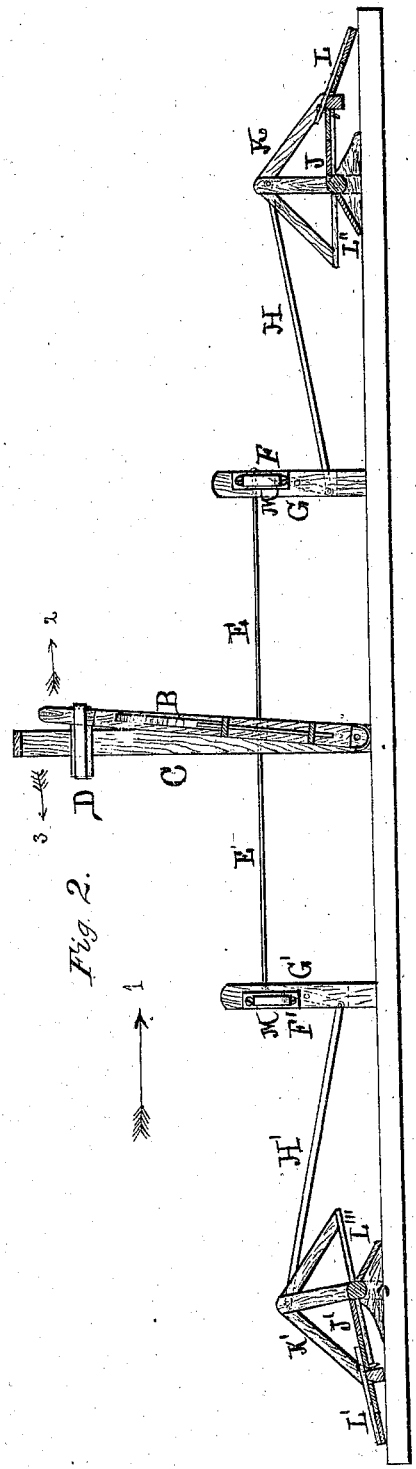

No. 105,366. Patented July 12, 1870

Witnesses:
Jas. L. Norris
W. H. Finckel

Inventor:
John Pool
by Diedersheim Morris
attys.

United States Patent Office.

JOHN POOL, OF ELIZABETH CITY, NORTH CAROLINA.

Letters Patent No. 105,366, dated July 12, 1870.

IMPROVEMENT IN FARM-GATES.

The Schedule referred to in these Letters Patent and making part of the same.

*To all whom it may concern:*

Be it known that I, JOHN POOL, of Elizabeth City, in the county of Pasquotank and State of North Carolina, have invented a new and useful Improvement in Gates; and I do hereby declare the following to be a clear and exact description thereof, sufficient to enable others skilled in the art to which my invention appertains to make and use the same, reference being had to the accompanying drawing making part of this specification, in which—

Figure 1 is a side view of the device, illustrating my invention.

Figure 2 is a central longitudinal section.

Similar letters of reference indicate corresponding parts in the several figures.

Figure 3:
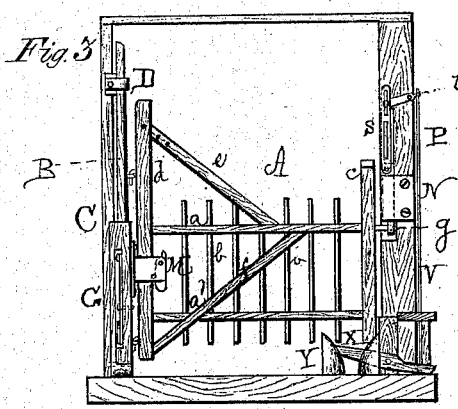
Figure 3 is a front view of the gate and the parts immediately connected therewith.
Figure 4:
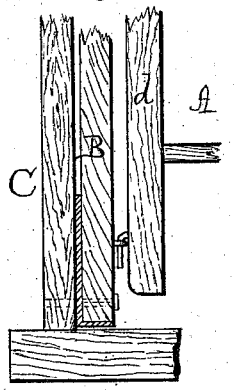
Figures 4 to 11 are views of detached parts.
Figure 5:
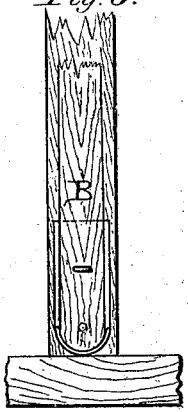

My invention is an improvement in the class of automatic opening and closing gates, and consists in hanging the gate to a hinged beam, which is to be projected in the direction opposite to that from which the horse or vehicle is coming, by means of hinged platform and intermediate levers, so that, when the horse or vehicle passes over one platform, and the rider or driver reaches the gate, he merely lifts the latch, whereby the gate is released and immediately flies open to its full extent. A weighted swinging catch is so located that the gate is caught and held open until the horse or vehicle arrives on the other platform, when the gate will be lifted clear of the catch and again fly shut.

The invention also consists in the peculiar construction of the latch and its connecting-parts, so that it can be operated by the action of the wheels of the vehicle, or by persons, whether mounted or afoot.

In the drawing—

A represents a gate, which may be of usual form, but, in the present case, I construct it as follows, (see fig. 3:)

$a\ a'$ represent horizontal bars;

$b\ b$, vertical rods; and $c\ d$, the vertical bars to which the horizontal bars are attached.

$e$ is a diagonal brace, extending from the top bar $a$ to near the upper end of the bar $d$, and is formed with a series of openings, through which, and the bar $d$, passes a pin or bolt, whereby provision is made for tightening the gate in case of sagging.

A brace, $f$, extends diagonally from the top bar $a$ to the bottom of the bar $d$, and through it pass the vertical rods $b$ and the lower bar $a'$.

A holding-bolt or pin, $g$, is forced into the front bar $c$ and the upper horizontal bar $a$, and obtains a firm support or bearing therein.

The gate A is hung, by suitable hinges, eyes, and hook-bolts, or otherwise, to a vertical beam, B, whose lower end is hinged at or near the bottom of an upright, C, which is firmly imbedded in or secured to the ground.

D represents a band, secured to the upper end of the upright C on the inner side thereof, and inclosing the upper end of the hinged beam B, whereby the latter is allowed to swing on its axis, to a limited extent, in a longitudinal direction.

To one side of the hinged beam B I pivot a bar or rod, E, which extends to a lever, F, pivoted to post G, to which lever F is also pivoted a bar or rod, H, which is pivoted to a platform, J.

A similar bar or rod, E', is pivoted to the other side of the hinged beam B, and to it is connected a lever, F', pivoted to a post, G', and a bar or rod, H', is pivoted to the lever F' and to a platform, J'.

The platforms J are hinged to pieces rising from the ground, and are pivoted to the levers H H' by frame-works K K'.

The horse or vehicle is to be driven over the platforms, and, in order to provide gradual ascent to and descent from the said platforms, sills L L' are fixed to the front ends of the platforms, and inclines L" L"', arranged at the inside thereof, said sills and inclines being so constructed as not to interfere with the free motion of the platforms.

On the posts G G' I secure ears, which support catches M, which are hung out of center and arranged in relation to the gate, whereby, when the gate is open, the pin $g$ on its front end will strike the upper end of one of the catches, ride freely over it, and then drop behind it, the gate thereby being firmly held open.

A latch, N, is arranged on an upright, P, opposite to the hinges of the gate, which latch is so constructed that it will allow the pin $g$ of the gate to automatically engage itself with said latch, and thus secure the gate, but be prevented from opening unless properly manipulated.

In the present case I construct the latch as follows:

O O represent two blocks, which are arranged to slide vertically within an opening in the post P, and to their lower ends are pivoted noses Q, which swing freely toward each other, but are prevented from outward movement by confining plates or pieces on the post, said pieces or plates thus constituting stops, and serving to hold the gate when closed.

Figure 6:
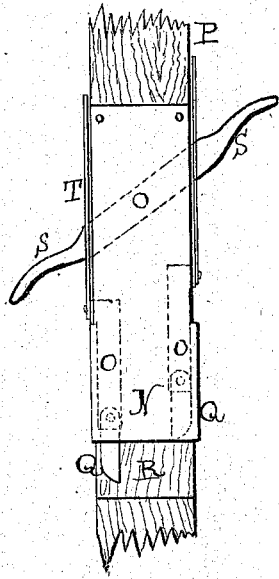
Figure 7:
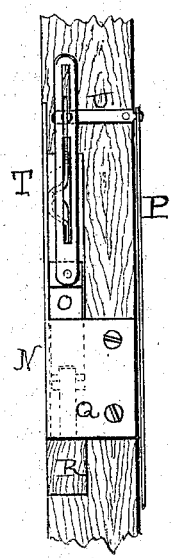
Figure 8:
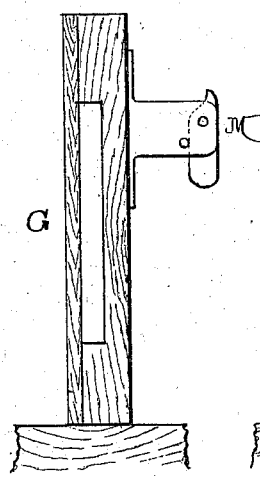
Figure 9:
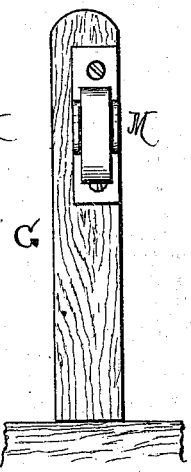
Figure 10:
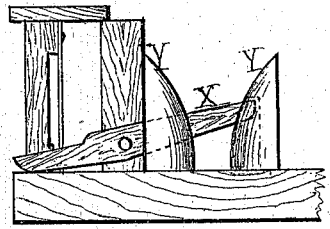
Figure 11:
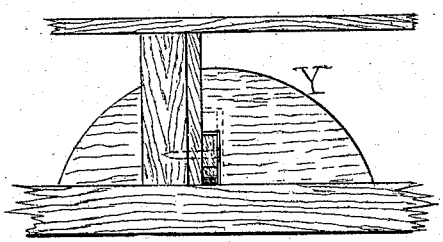

The noses of the latch swing within a recess, R, but move vertically with the blocks O O, when the latter are elevated or lowered, this being accomplished by means of a lever, S, as seen in figs. 1 and 6.

This lever is hinged to the upright P, and projects on both sides through slots formed in plates T, which are arranged on the sides of said upright P, and connected to the blocks O O.

When the lever on one side is depressed, it raises the nose on the other side, without disturbing the nose on its own side, and so with the operation of the lever on the opposite side.

A single lever thus operates the two noses of the latch without causing interference of each other, and is designed to be manipulated by hand, whether the person is mounted or on foot.

An auxiliary means of operating the latch is by the wheels of vehicles. In this case, levers U are pivoted to the upright P, and are connected to the slotted plates T by pins, which pass through slots in the upper end of said plates.

To the levers U are also pivoted cross-bars V, to whose lower end are pivoted levers W, which extend longitudinally, and have their free ends rest on transverse levers X. These levers are in position to be depressed by the weight of the vehicle which is designed to enter the gate.

To prevent cattle, &c., from operating said levers X, I provide guards Y, which are arranged to allow the free passage of the wheels, but prevent the feet of cattle, and animals generally, from interfering with the levers. For this purpose, the ends of the guard are flaring, and the levers are elevated above the ground.

The operation is as follows:

If a vehicle, or horse, or other animal is coming in the direction of the arrow 1, fig. 2, its weight depresses the platform J', and, through the intermediate bars and levers E' F' H', throws the hinged beam in the direction arrow 2. The center of gravity of the gate is thus changed, whereby, when the wheels of the vehicle ride over the lever X between the guards, as heretofore described, or when the rider or driver of the horse or animal reaches the lever S of the latch N, and operates it, the gate is free, and immediately flies open. It now catches on the latch of post G, and is thereby firmly held.

The carriage or animal passes on, and, when it reaches the opposite platform, J, its weight depresses it, and, by means of the levers E F H, the beam B is thrown in the direction of arrow 3, lifting the gate clear of the latch which held it, and changing its center of gravity. The gate at once flies shut, and its pin engages with the latch N, as previously stated.

The operation of the gate in the direction opposite to arrow 1 is in reverse order to that described.

In either case, the mode of operation is the same. The gate never swings open toward the party opening it, this being a serious objection to gates, the animals being frightened thereby.

In southern countries, where wood is plentiful and finely finished gates are unnecessary, the gate may readily be made entirely of wood, and is thus in the reach of the humblest farmer.

Having thus described my invention,

What I claim as new, and desire to secure by Letters Patent, is—

1. The hinged beam B, carrying the swinging gate, substantially as and for the purpose described.

2. The latch N, so constructed that it may be operated by the hand-lever S, or the wheel-lever X, substantially as and for the purpose described.

3. The cross-bars V, levers U, levers W, and levers X, combined and operating with the latch N, substantially as and for the purpose described.

The above signed by me this 4th day of May, 1870.

JOHN POOL.

Witnesses:
JOHN A. WIEDERSHEIM,
T. C. CONNOLLY.